United States Patent [19]

Danielsson et al.

[11] Patent Number: 4,775,952
[45] Date of Patent: Oct. 4, 1988

[54] PARALLEL PROCESSING SYSTEM APPARATUS

[75] Inventors: Per-Erik Danielsson; Robert M. Mattheyses, both of Schenectady, N.Y.

[73] Assignee: General Electric Company, Schenectady, N.Y.

[21] Appl. No.: 868,923

[22] Filed: May 29, 1986

[51] Int. Cl.[4] .............................................. G06F 15/31
[52] U.S. Cl. ..................................... 364/736; 364/200
[58] Field of Search ... 364/736, 748, 749, 200 MS File

[56] References Cited

U.S. PATENT DOCUMENTS

| 3,312,943 | 4/1967 | McKindles et al. | 340/172.5 |
| 3,364,472 | 1/1968 | Sloper | 340/172.5 |
| 4,525,776 | 6/1985 | Eldumiati et al. | 364/736 |
| 4,580,215 | 4/1986 | Morton | 364/200 |
| 4,592,005 | 5/1986 | Kregness | 364/736 |

FOREIGN PATENT DOCUMENTS 1201208  2/1983  Canada ................................ 364/736

OTHER PUBLICATIONS

Reddaway, "DAP—A Distributed Array Processor", 1st Annual Symposium on Computer Architecture, Dec. 1973, pp. 61-65.
Duff, "Review of the CLIP Image Processing System", National Computer Conference, pp. 1055-1060, 1978.
Batcher, "Design of a Massively Parallel Processor", IEEE Trans. on Computers, vol. C-29, #9, pp. 836-840.
Fountain et al., "Towards Clip 6—an Extra Dimension", IEEE Computer Soc. Wrkshp. on Computer Architecture for Pattern Analysis and Image Database Management, pp. 25-30.
"Digital Computer Arithmetic Design and Implementation" by Joseph J. F. Cavanagh, McGraw-Hill, 1984, pp. 252-258.

Primary Examiner—Gary V. Harkcom
Assistant Examiner—Dale M. Shaw
Attorney, Agent, or Firm—Richard V. Burgujian; James C. Davis, Jr.; Paul R. Webb, II

[57] ABSTRACT

Configured for accelerated operation of processing elements in a SIMD parallel processing system is disclosed. The output of an exclusive-OR gate is coupled to one input of the element ALU while a first input of the gate is adapted to receive signals intended for the ALU input. Upon loading a '1' bit into a register coupled to a gate second input, signals applied to the gate first input are complemented and applied to the ALU input. As a result, different arithmetic and logic operations can be performed simultaneously by different elements in the processing system in response to a single series of instructions.

12 Claims, 2 Drawing Sheets

PARALLEL PROCESSING SYSTEM APPARATUS

The invention relates, in general, to apparatus for accelerating the operation of a parallel processing system and more specifically to a process accelerator for use in the processing elements of such a system.

BACKGROUND OF THE INVENTION

Parallel processing system is used herein to describe a system in which a plurality of independent, interconnected arithmetical-logical processing elements operate in parallel to perform a multiplicity of processing functions. The processing elements in the system are, typically, substantially identical to one another and interconnected. In one type of parallel processing system known in the art as a single instruction multiple data (SIMD) system, a single sequence of instructions is provided to all processing elements. That is, all elements simultaneously receive and perform operations in accordance with the same sequence of instructions. However, each element may be performing the operations dictated by the instructions on different sets of data.

The individual processing elements of a SIMD parallel processing system typically have dedicated memories which may be loaded with data on which instructed operations can be performed. Also, each element can perform operations on data transmitted to it from another element, e.g., an adjacent element. Thus, there is flexibility in the operations performed by the elements insofar as derives from varying the data upon which each element operates. However, all processing elements must perform the same operations in accordance with the instructions. For example in the case of instructed arithmetic operations, one element cannot be instructed to perform addition while another is instructed to perform subtraction.

SIMD parallel processing systems may include the feature that a processing element can be conditioned to perform no operation at all in response to an instruction. Such a feature adds flexibility to system operation. For example, this feature facilitates the performance of calculations in which a series of arithmetic operations are performed, the nature of each operation being determined by the result of a previous operation. With the processing elements operating on different data, dfferent elements will need to perform different arithmetic operations. It is, therefore, not possible to prescribe a single sequence of instructions valid for all elements. In such a case, when an element is instructed to perform an inappropriate operation, it will instead perform no operation.

One example of such a calculation is the nonrestoring division method for binary numbers. One form of this method is generally described in "Digital Computer Arithmetic Design and Implementation" by Joseph J. F. Cavanagh, McGraw-Hill, 1984, pp. 252-258, incorporated herein by reference. Briefly, in the two's complement number system, the dividend and divisor are appropriately aligned, the dividend left-shifted one bit position and the divisor subtracted therefrom. The sign of the subtraction result determines whether the next operational step should be the addition or subtraction of the divisor to or from the result, after the result is shifted one position left. A quotient bit is derived from the sign of the result at each step. Thus, the result at each calculation step determines the type of operation (i.e., addition or subtraction) to be performed at the next step. If nonrestoring division is performed in a parallel processing system, with each element operating on different data, there is no single sequence of addition and subtraction instructions valid for all elements.

As discussed above, one solution to this problem is to condition each processing element to perform no operation if an instruction is inappropriate. For example, in nonrestoring division, an alternating sequence of addition and subtraction instructions is applied to the SIMD parallel processing system. For each instruction only those processing elements for which the instructed operation is appropriate, perform the operation. The balance of the elements perform no operation and wait for the next instruction. This solution results in inefficient sytem operation since twice as many addition and subtraction instructions are required as is necessary.

OBJECTS OF THE INVENTION

It is a principal object of the present invention to provide a new and improved processing element, for use in a SIMD parallel processing system, which is not subject to the aforementioned problems and disadvantages.

Another object of the present invention is to provide a processing element, for use in a SIMD parallel processing system, adapted to enable different operations to be performed simultaneously by different elements.

A further object of the present invention is to provide means for enabling different processing elements in a SIMD parallel processing system, to perform different arithmetic or logic operations substantially simultaneously.

An additional object of the present invention is to provide a processing element, for use in a SIMD parallel processing system, including means for enabling different elements in the system to perform addition and subtraction substantially simultaneously.

SUMMARY OF THE INVENTION

The foregoing objects are accomplished by the present invention which is directed to a processing element, for use in a SIMD parallel processing system, including means for accelerating operation of the element and system. The processing element comprises an arithmetic/logic unit (ALU) including A- and B-inputs, a carry-in input, a result output and a carry-out output. An exclusive-OR gate has an output coupled to the B-input of the ALU, a first input adapted to receive signals intended for the ALU B-input, and a second input. The element further comprises multiplexing means having an output coupled to the ALU carry-in input and two inputs to respectively receive a signal on the ALU carry-out output and an initial carry-in signal. A register has a signal output coupled to the gate second input, a signal input coupled to a point between the multiplexing means output and the ALU carry-in input and a control input to receive a register load signal.

In operation, selected processing elements in the system receive a logic '1' initial carry-in signal. The multiplexing means directs the '1' signal to its output and the register loads the signal in response to a load signal. The '1' signal is applied to the gate second input which results in signals on the gate output being the complements of those applied to the gate first input, the gate output signals being applied to the ALU B-input. With the multiplexing means operated to direct signals on the ALU carry-out output to the ALU carry-in input and the ALU instructed to add the signals on the A- and B-inputs, the signal applied to the gate first input is subtracted from that applied to the A-input. In general, storing a '0' or '1' signal in the register results in the ALU performing an instructed operation on the signals applied to the ALU A- and carry-in inputs and, respectively, the signal applied to the gate first input or its complement.

Thus, by loading '0' or '1' in different ones of the respective element registers in a SIMD parallel processing system, a single sequence of instructions enables performance of different operations by the elements. Since concatenating two sequences of instructions, one for each of the different operations, would otherwise be required, the performance of the elements and processing system is accelerated by use of the present invention.

These and other objects of the invention, together with the features and advantages thereof, will become apparent from the following detailed decription when read together with the accompanying drawings in which applicable reference designations have been carried forward.

DESCRIPTION OF THE INVENTION

Figure 1:
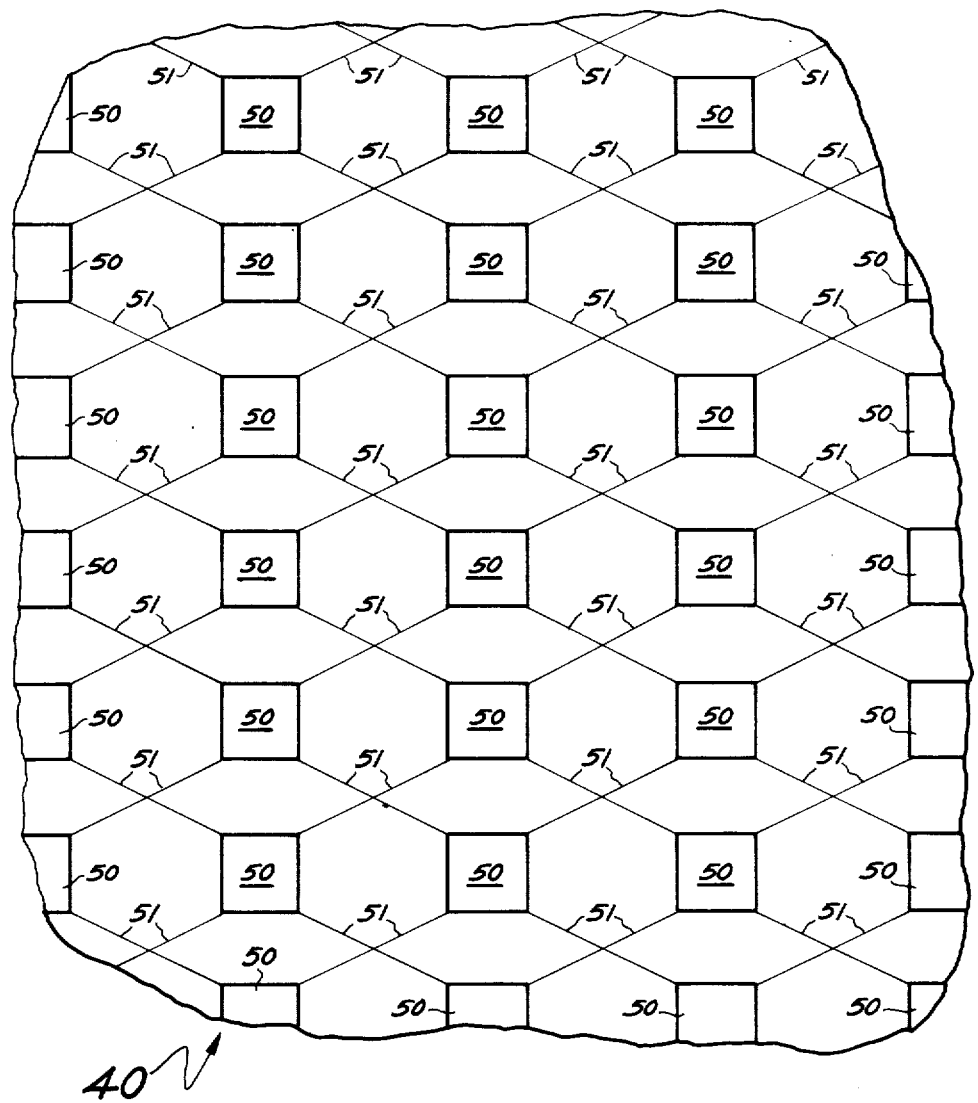
FIG. 1 is a diagrammatic illustration of a parallel processing system.

FIG. 1 illustrates a parallel processing system 40 comprising a plurality of arithmetical-logical processing elements 50 locally interconnected through connections 51. Elements 50 may be further interconnected through a communication network not shown. System 40 is of the SIMD type such that a single sequence of instructions is provided to all processing elements therein.

Figure 2:
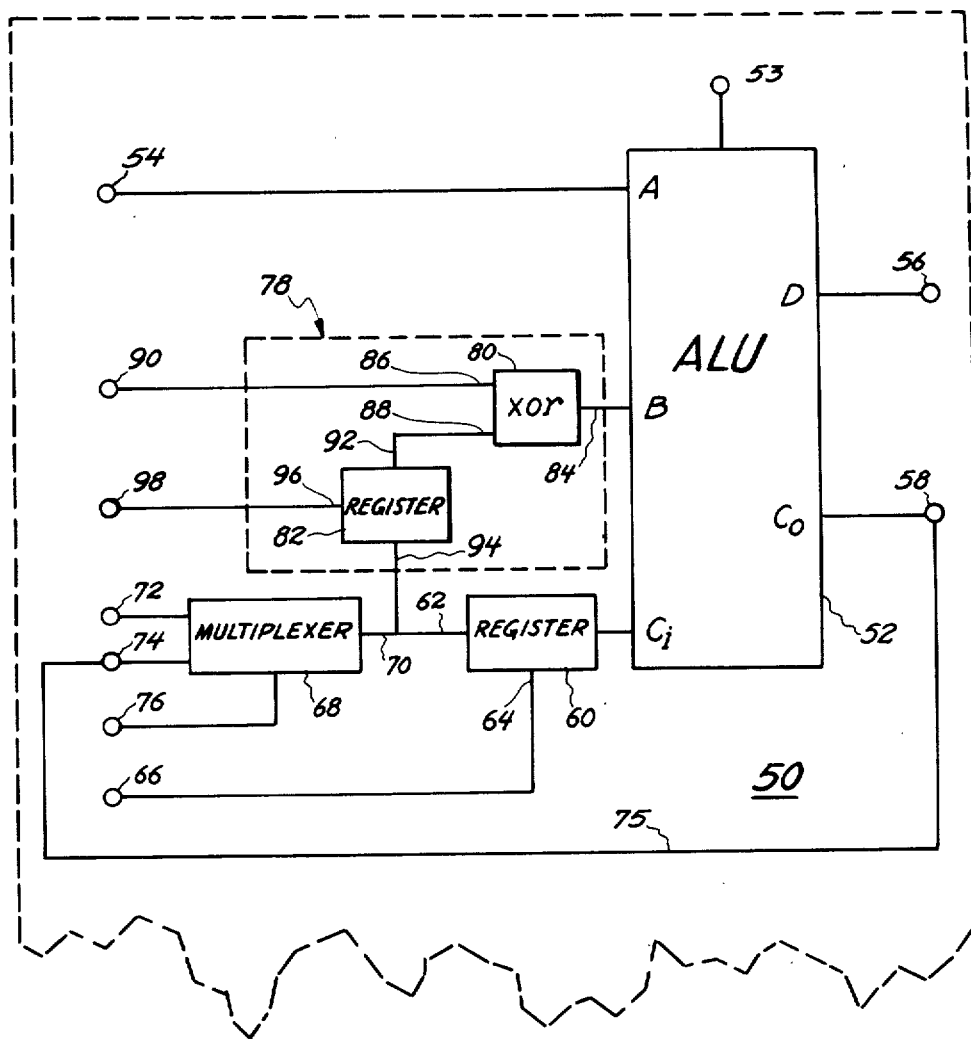
FIG. 2 is an illustrative block diagram of a processing element constructed in accordance with the present invention.

FIG. 2 illustrates the portion of processing element 50 pertinent to the present invention. Element 50 comprises electronic circuitry including an arithmetic/logic unit (ALU) 52 having signal inputs designated A, B, and $C_i$ and signal outputs D and $C_o$. The A-input is connected to an input terminal 54, while outputs D and $C_o$ are respectively connected to output terminals 56 and 58. The ALU also includes an instruction port 53 for receiving operating instructions. In the preferred embodiment of the present invention, ALU 52 is of the type known in the art adapted to serially receive binary signals on the A-, B- and $C_i$-inputs and perform arithmetic or logic operations thereon, in accordance with instructions applied to port 53. The results of operations performed by the ALU are provided on the $C_o$- and D-outputs. Carry-out bit signals from arithmetic operations appear on the $C_o$-output. The $C_i$-input of the ALU is adapted to receive a carry-in bit signal when addition is performed. A one bit register 60 is connected to the $C_i$-input to hold a carry-in bit signal. Register 60 includes a signal input 62 and a control input 64, the latter connected to a control terminal 66 for receiving a load signal effective to cause register 60 to load the signal applied to input 62. The signal held in register 60 is available at the $C_i$-input.

Element 50 further includes a multiplexer 68 having an output 70 coupled to register input 62. Multiplexer 68 includes two signal input terminals 72 and 74 and a control input terminal 76. Signals appearing on terminal 58 are applied to terminal 74 by means such as a connection 75. Multiplexer 68 directs a signal applied to terminal 72 or 74 to its output 70 in response to a multiplexer control signal applied to terminal 76.

Element 50 additionally includes logic means 78, for accelerating operation of the element, including an exclusive-OR gate 80 and memory means in the form of a one bit register 82. Gate 80 has an output 84 connected to the ALU B-input and inputs 86 and 88 respectively connected to an input terminal 90 and a signal output 92 of register 82. Register 82 also includes a signal input 94 and a control input 96, the latter connected to a control input terminal 98, for receiving a load signal effective to cause register 82 to load the signal present on input 94. The signal held in register 82 is available at gate input 88.

In operation, ALU 52 in each element 50 of system 40 receives binary signals on its A-, B- and $C_i$-inputs and performs operations thereon in accordance with operating instructions applied to port 53. Results of the operations are provided on outputs D and $C_o$. Note that the previously discussed control signals that may be applied to terminals 76, 66 and 98, to respectively control operation of multiplexer 68, register 60 and register 82, are included in the operating instructions applied to elements 50 of system 40.

In accordance with the present invention, signals intended for the A- and B-inputs of ALU 52 are respectively applied to terminals 54 and 90. A signal intended for the $C_i$-input is applied to terminal 72 and, by applying the appropriate multiplexer control signal to terminal 76, directed to register input 62. It can then be loaded into register 60, by applying a load signal to terminal 66, to be available at the $C_i$-input. If register 82 holds a logic '1' signal, a '1' is available at input 88 of gate 80. The exclusive-OR logic of the gate with a '1' at input 88, provides on gate output 84 the complement of each signal applied to terminal 90. If a logic '0' signal is held in register 82, signals applied to terminal 90 appear, unmodified, on gate output 84. In a SIMD parallel processing system, it is possible to selectively load, e.g., as data, into the respective registers 82 of the system elements, logic '1' or '0' signals. While all elements in the system operate in accordance with a single sequence of instructions, those with '0' held in register 82 will perform operations on the signals applied to the ALU A- and $C_i$-inputs and terminal 90 while those with '1' held in register 82 perform the same operations on the signals applied to the A- and $C_i$-inputs and the complement of the signal applied to terminal 90. Since concatenating two sequences of instructions would otherwise be required to accomplish this, the present invention accelerates operation of the elements and the SIMD parallel processing system.

Two examples are provide to illustrate the utility and advantages the present invention affords to SIMD parallel processing systems. The first example relates to the practice known in the art as using an ALU to compute a Boolean function on a plurality of input variables. Any Boolean function can be represented as a truth table enumerating all possible input patterns and associating with each pattern an output bit representing the corresponding Boolean function value. The number of Boolean functions that a particular ALU implements determines the number of bits in the input pattern required to specify each function. For example, if an ALU implements 16 ($=2^4$) different Boolean functions, a four bit input is required to select a specific function. Similarly, if an ALU implements 32 (=$2^5$) different Boolean functions, a five bit input is required to select the function to be evaluated. Each output of ALU 52 can implement any three-input Boolean function. Thus, a function that can be implemented by ALU 52 is specified by a truth table. Then, to specify the function at one of the ALU 52 outputs, 8(=$2^3$) bits are required, each bit specifying the result corresponding to one of the eight patterns of input bit values. Thus 16 bits are sufficient to fully specify both outputs D and $C_o$ for ALU 52. The truth table bits are applied to the ALU as an instruction. In a SIMD parallel processing system, such as system 40, the same instruction and hence the same truth table must be applied to all elements in the system.

The present invention enables instructing the ALU in selected processing elements in the processing system 40 to perform operations on the signals applied to terminals 54, 72 and 90 while other processing elements simultaneously receive identical instructions resulting in the ALU performing the same operations on the signals on terminals 54 and 72 and the complement of the signal on terminal 90. One way to accomplish this is to, initially, selectively apply as data a '0' or '1' signal to the respective terminals 72 of the elements in the processing system. The appropriate multiplexer control signal is applied to terminal 76 in all elements. This causes the respective multiplexers to direct the signal on input 72 to output 70. Then, the signal of multiplexer output 70 in all elements is loaded into register 82, i.e., by applying a load signal to control terminal 98. As a result, while all elements receive the same instruction embodying the same truth table, those with a '0' held in register 82 will provide an output of the truth table value corresponding to the signals applied to terminals 54, 72 and 90, while those with a '1' held in register 82 instead provide the table value for the signals applied to terminals 54 and 72 and the complement of the terminal 90 signal. Where two sequences of instructions would otherwise have been required, one sequence to operate on the terminal 90 signal and a second subsequent sequence to perform operations with the complement of that signal, a single instruction sequence suffices, when used in conjunction with the present invention, to perform both operations simultaneously.

The second example illustrating the utility and advantages of the present invention relates to its enabling the simultaneous performance of addition and subtraction, in the two's complement number system in different elements in system 40. Initially a '1' bit or '0' bit is applied, as data, to multiplexer input 72 in elements where, respectively, subtraction or addition is to be performed. The appropriate multiplexer control signal applied to respective control terminals 76 of all elements causes the bit on input 72 to be directed to output 70. Load signals are applied to control terminals 66 and 98 causing the bit on output 70 to be loaded in both registers 60 and 82. Subsequently, the multiplexer receives another control signal causing it to direct signals subsequently received on input 74, to which the ALU carry-out output is connected via terminal 58, to multiplexer output 70. Next, the two binary numbers to be added or subtracted are serially applied to terminals 54 and 90 respectively, commencing with the least significant bit (LSB), and the ALU is instructed to add the bits on its A-, B- and $C_i$-inputs. In those elements where a '1' is held in register 82 and therefore applied to input 88 of exclusive-OR gate 80, the complement of the signal on terminal 90 appears at the ALU B-input. Thus with respect to the LSB, the bit on the A-input, the complement of the bit on terminal 90 and the '1' bit held in register 60 are added. In elements where a '0' is held in register 82, with respect to the LSB the ALU adds the bits on the A-input and terminal 90 and the '0' held in register 60.

With respect to all elements, if there is a carry-out signal from the LSB add operation, it appears on ALU output $C_o$ and is applied to multiplexer input 74. The multiplexer directs the carry-out signal to output 70. A load signal is applied to terminal 66 to cause the carry-out signal, if any, to be loaded in register 60 to be available for addition with the next bit by the ALU. The carry-out, if any, of each bit addition operation is stored in this manner. In all elements, the addition of the increasingly significant bits following the LSB consists of adding the bit on the A-input, the bit on terminal 90 or its complement depending on whether, respectively, a '0' or '1' is held in register 82, and a carry-in bit, if present, in register 60.

The effect of the above-described operation, in elements with a '1' held in register 82, is to add the '1' initially held in register 60, the complement of the signal on terminal 90 and the signal on the A-input. As is known in the art, with respect to two's complement arithmetic, adding a '1' to the complement of a signal yields the negation of the signal in the two's complement form. Thus, the negation of the terminal 90 signal is added to the A-input signal which results in the subtraction of the signal on terminal 90 from that on the A-input. In elements where a '0' is held in register 82, the ALU simply adds the signals on the A-input and terminal 90. Thus, in response to a single sequence of add instructions, those elements in the system with a '1' held in register 82 perform a subtraction operation while those with a '0' held in that register perform addition.

The ability to simultaneously add and subtract in a SIMD parallel processing system has obvious utility in performing the nonrestoring division method. As discussed above, and described in the above-cited text by Cavanagh, an addition or subtraction is performed at each step of the method depending on the sign of the previous step result. In particular, if a result is negative, the divisor is added to the result, after the result is shifted one bit position left. If a result is positive, the divisor is subtracted from the result after the result is left-shifted. However, implementing the method in a processing system comprising elements 50 enables different elements to simultaneously perform addition or subtraction as determined by the sign of the result in the previous step.

After aligning the divisor and dividend as prescribed in the Cavanagh text, the initial step of the method is to subtract the divisor from the dividend. To effect the subtraction, a '1' bit is applied to multiplexer input 72 of all elements 50 in the system and the operations described above are performed.

The sign bit of the initial step result, as well as each subsequent step result, is inverted, by means not shown in FIG. 2, applied to multiplexer input 72 and stored in registers 60 and 82. Thus, if the result of the step has a sign bit of '0', i.e., a positive result, the '0' is inverted to '1' and loaded in registers 60 and 82. This causes the ALU to perform subtraction, in response to an addition instruction, in the next step, in the manner described above. If, instead, the sign bit is '1', i.e., a negative result, the '1' is inverted to '0' and loaded in registers 60 and 82. This causes the ALU to perform addition in response to an addition instruction, as described above. Thus, in executing the nonrestoring division method, element 50 in response to addition instructions, performs addition or subtraction at each step in accordance with the result of the previous step. In this manner, a SIMD processing system comprising elements 50 performs non-restoring division from a sequence of addition instructions.

It is understood that the ALU in FIG. 2 is shown with only those inputs and outputs considered germane to the illustrated embodiment of the present invention. As is well known, such ALU's may have different input/output configurations and perform some functions that differ from those discussed herein. However, since virtually all ALU's used in processing elements include the inputs and outputs illustrated herein and perform addition, the present invention may be advantageously practiced with such ALU's irrespective of how they are configured or the other functions they are capable of performing.

The processing element illustrated herein includes terminals both for receiving and providing signals. Such terminals are included herein merely to facilitate description of the present invention's operations. In practice, the portion of the processing element disclosed herein may be integrated onto a circuit chip including other devices which, while not pertinent to the practice of the present invention, are nonetheless necessary components of the element. In such a case, the devices illustrated herein may be either directly connected to other devices on the element chip or to input/output terminals of the chip.

While multiplexer 68 is illustrated herein as having two inputs, this need not be the case. The multiplexer may include additional inputs to enable performance of signal transfers not relevant to the present invention's operation. The representation of terminal 76 and port 53 as connected to single line inputs is diagrammatic only. Each input includes the number of lines necessary to receive its respecive signal or instruction. For example, port 53 may consist of 16 input lines to receive a 16-bit instruction. Similarly, terminal 76 represents a number of input lines dependent on the number of inputs on multiplexer 68.

Where the present invention is practiced with a processing element having a dedicated memory, the '0' or '1' bit signals for loading into registers 60 and 82 may be stored in that memory prior to instructing the ALU to perform arithmetic or logic operations. Then, rather than applying the '0' or '1' bit as data on multiplexer input 72, as described above, the bit can be recalled from memory and applied to the multiplexer input. Where the bit is stored at the same address location of the respective memories for all elements 50 of system 40, the same recall instruction can be simultaneously applied to all elements.

While a preferred embodiment has been illustrated and described herein, it will be obvious that numerous modifications, changes, variations, substitutions and equivalents, in whole or in part, will occur to those skilled in the art without departing from the spirit and scope contemplated by the invention. Accordingly, it is intended that the invention herein be limited only by the scope of the appended claims.

What is claimed is:

1. A processing element for use in a single instruction multiple data parallel processing system comprising a plurality of said processing elements, said element comprising:
    an arithmetic/logic unit (ALU) comprising electronic circuitry for performing binary logic operations on signals applied thereto;
    an exclusive-OR gate coupled to receive a first input signal and apply an output signal to said ALU;
    memory means for storing a signal, the signal stored in said memory means being outputted to said gate; and
    said gate providing said output signal to said ALU as the complement of said first input signal only upon a second being stored in said memory means and thereby outputted to said gate, said gate providing said output signal to said ALU as said first input signal in the absence of said second signal;
    so that upon storing said second signal in the respective memory means of selected ones of said processing elements of said parallel processing system and subsequently instructing all said processing elements to perform an operation on the signals applied to their respective ALUs, the selected processing elements perform the instructed operation on the complement of said first input signal while the non-selected elements perform the instructed operation on said first input signal.

2. The processing element of claim 1 wherein said memory means is responsive to a control signal to store a signal therein.

3. The processing element of claim 2 wherein said memory means is a register for storing a one bit signal.

4. The processing element of claim 1 further including multiplexing means for receiving a plurality of signals and directing one of said received signals to a multiplexing means output;
    said ALU including a first input for receiving said output signal from said exclusive-OR gate, a second input and an output;
    said multiplexing means coupled to receive a signal on said ALU output and said second signal, said multiplexing means being responsive to a multiplexing means control signal to direct either said ALU output signal or said second signal to said multiplexing means output; and
    said ALU second input and said memory means both coupled to receive a signal appearing on said multiplexing means output.

5. A processing element for use in a single instruction multiple data parallel processing system comprising a plurality of said processing elements, said elements comprising:
    an arithmetic/logic unit (ALU) having input, said ALU comprising electronic circuitry for performing binary logic operations on signals applied thereto;
    an exclusive-OR gate having first and second inputs and on output coupled to said ALU input;
    memory means for storing a signal, said memory means being coupled to said second input of said exclusive-OR gate, a signal stored in said memory means being outputted to said gate second input; and
    said gate providing on said gate output for application to said ALU input the signal applied to said gate first input or the complement thereof respectively according to whether a first signal is or is not stored in said memory means;

so that upon storing said second signal in the respective memory means of selected ones of said processing elements of said parallel processing system and subsequently instructing all said processing elements to perform an operation on the signals applied to their respective ALUs, the selected processing elements perform the instructed operation on the complement of said first input signal while the nonselected elements perform the instructed operation on said first input signal.

6. The processing element of claim 5 wherein said memory means is a register for holding a one bit signal.

7. The processing element of claim 5 wherein said ALU input is a first input and said memory means is a first memory means, said ALU further including second and third inputs and first and second outputs, said ALU comprising circuitry for adding binary signals applied to said ALU first and second inputs, said ALU being further coupled to receive a carry-in signal and provide a carry-out signal on said ALU third input and second output respectively;

second memory means for storing a signal, said second memory means being coupled to said ALU third input, a signal stored in said second memory means being available at said ALU third input; and means for selectively storing said first signal in said first and second memory means or storing a signal on said ALU second output only in said second memory means;

so that upon storing said first signal in said first and second memory means and applying second and third binary signals representative of two's complement numbers respectively to said ALU second input and said gate first input, the addition of the signals at said ALU first and second inputs by said ALU and the storage of carry-out signals in said second memory means, results in the subtraction of said third signal from said second signal.

8. The processing element of claim 7, wherein said first and second memory means respectively comprise first and second registers each for holding a one bit signal.

9. A single instruction multiple data parallel processing system comprising a plurality of processing elements, each of said elements including:

an arithmetic/logic unit (ALU) comprising electronic circuitry for performing binary logic operations on signals applied thereto;

an exclusive-OR gate coupled to receive a first input signal and apply an output signal to said ALU;

memory means for storing a signal, the signal stored in said memory means being outputted to said gate; and said gate providing said output signal to said ALU as the complement of said first input signal only upon a second signal being stored in said memory means and thereby outputted to said gate, said gate providing said output signal to said ALU as said first input signal in the absence of said second signal;

so that upon storing said second signal in the respective memory means of selected ones of said processing elements of said parallel processing system and subsequently instructing all said processing elements to perform an operation on the signals applied to their respective ALUs, the selected processing elements perform the instructed operation on the complement of said first input signal while the nonselected elements perform the instructed operation on said first input signal.

10. The parallel processing system of claim 9 wherein said memory means in each said element is responsive to a control signal to store a signal therein.

11. The parallel processing system of claim 9, each of said elements further including multiplexing means for receiving a plurality of signals and directing one of said received signals to a multiplexing means output;

said ALU including a first input for receiving said output signal, a second input and an output;

said multiplexing means coupled to receive a signal on said ALU output and said second signal, said multiplexing means being responsive to a multiplexing means control signal to direct either said ALU output signal or said second signal to said multiplexing means output; and said ALU second input and said memory means both coupled to receive a signal appearing on said multiplexing means output.

12. The parallel processing system of claim 9, wherein said memory means is a first memory means;

said ALU including a first input to receive said output signal, second and third inputs and first and second outputs, said ALU comprising circuitry for adding binary signals applied to said ALU first and second inputs, receive a carry-in signal on said ALU third input and provide sum and carry-out signals on said ALU first and second outputs respectively;

second memory means for storing a signal, the signal stored in said second memory means being outputted to said ALU third input;

means for selectively storing either said second signal in said first and second memory means or a signal on said ALU second output in said second memory means only; and the respective ALU's of said elements in said parallel processing system each responsive to an instruction set applied thereto to perform binary logic operations, said elements in said parallel processing system coupled to simultaneously receive the same instruction set;

so that upon storing said second signal in said first and second memory means in selected elements of said parallel processing system and applying said first signal and a third binary signal respectively to said gate and said ALU second input of each of said elements in said parallel processing system, and further upon applying an addition instruction to said elements in said parallel processing system, the addition of the signals at said ALU first and second inputs by said ALU and the storage of carry-out signals in said second memory means, results in the subtraction of said first signal from said third signal in said selected elements and the addition of said first and third signals in the non-selected elements.

* * * * *

UNITED STATES PATENT AND TRADEMARK OFFICE
CERTIFICATE OF CORRECTION

PATENT NO. : 4,775,952
DATED : October 4, 1988
INVENTOR(S) : Per-Erik Danielsson et al It is certified that error appears in the above-identified patent and that said Letters Patent is hereby corrected as shown below:

Column 8, Line 13, after "second", insert --signal--.

Signed and Sealed this

Twenty-eighth Day of February, 1989

*Attest:*

DONALD J. QUIGG

*Attesting Officer*  *Commissioner of Patents and Trademarks*